(12) United States Patent
Lei et al.

(10) Patent No.: US 9,725,015 B2
(45) Date of Patent: Aug. 8, 2017

(54) CONNECTING DEVICE OF LINEAR DRIVE

(71) Applicant: OKIN Refined Electric Technology Co., Ltd., Jiaxing, Zhejiang (CN)

(72) Inventors: Minglong Lei, Zhejiang (CN); Long Li, Zhejiang (CN)

(73) Assignee: OKIN Refined Electric Technology Co., Ltd. (CN)

( * ) Notice: Subject to any disclaimer, the term of this patent is extended or adjusted under 35 U.S.C. 154(b) by 101 days.

(21) Appl. No.: 14/608,128

(22) Filed: Jan. 28, 2015

(65) Prior Publication Data
US 2016/0101711 A1    Apr. 14, 2016

(30) Foreign Application Priority Data
Oct. 13, 2014  (CN) .................... 2014 2 0589664 U

(51) Int. Cl.
*F16M 13/00* (2006.01)
*B60N 2/06* (2006.01)
*B60N 2/08* (2006.01)
*B60N 2/02* (2006.01)

(52) U.S. Cl.
CPC ........... *B60N 2/067* (2013.01); *B60N 2/0818* (2013.01); *B60N 2002/024* (2013.01)

(58) Field of Classification Search
CPC .... B60N 2/067; B60N 2/0818; B60N 2/0722; B60N 2002/024; B60N 2/0232; B60N 2/2231; B60N 2/23; B60N 2/233
USPC ...................... 248/429; 297/362.14; 411/368
See application file for complete search history.

(56) References Cited

U.S. PATENT DOCUMENTS 6,322,146 B1 * 11/2001 Fisher, Jr. ............ B60N 2/0232
                                                297/362.11

\* cited by examiner

*Primary Examiner* — Christopher E Garft
(74) *Attorney, Agent, or Firm* — Wiersch IP Law PLLC

(57) ABSTRACT

Connecting device of linear drive includes a main body part with a rectangular profile, and a hardware stamping. The two opposite sides of the main body part are respectively fixedly connected with the hardware stamping. The middle portion of the main body part has a hollow cavity. A threaded axle hole device with threaded holes inside is accommodated in and fixedly connected with the cavity. The lateral walls of the cavity have locating protrusions. The hardware stamping includes two reverse bends between which the portion is disposed above the main body part. The lower portion of the hardware stamping is tightly adhered to the lateral side of the main body and bolted, while the upper portion of the hardware stamping has a connecting hole. The connecting device is light in structure, small in size and more convenient to install and is improved in bearing capability and operation stability.

6 Claims, 2 Drawing Sheets

CONNECTING DEVICE OF LINEAR DRIVE

FIELD

The present invention relates to a connecting device of a linear drive, belonging to the technical field of drive parts.

BACKGROUND

Common connecting devices applied to the linear drives at present are large in size. Those connecting devices are usually mounted at the bottom of the chair, so the space is relative is small, and the large connecting devices are inconvenient to install, and the structure which connects the connecting device and the chair regulating mechanism has poor stability and is easy to damage.

SUMMARY

The objective of the present invention is to overcome the defects in the prior art so as to provide a connecting device of a linear drive that is convenient to install, runs reliably and has excellent durability.

The present invention relates to a connecting device of a linear drive is provided, including a main body part and a hardware stamping. The main body part has a rectangular profile, and the two outer sides of the main body part are respectively fixedly connected with the hardware stamping.

The middle portion of the main body part is provided with a hollow cavity. A threaded axle hole device is accommodated in and fixedly connected with the cavity. The threaded axle hole device has threaded holes inside. The lateral walls of the cavity are provided with locating protrusions. The hardware stamping includes two reverse bends, and the portion between the two reverse bends is located above the main body part. The lower portion of the hardware stamping is tightly adhered to the lateral side of the main body and bolted, while the upper portion of the hardware stamping is provided with a connecting hole.

Furthermore, the cavity includes two rectangular cavities different in size.

Furthermore, the main body part is made of plastic materials.

Furthermore, the locating protrusions are disposed on the inner wall of the cavity in a vertically symmetric way.

Furthermore, the quantity of the locating protrusions is 3 on each of the upper and lower sides.

Furthermore, an axle sleeve is also included, sleeved in the connecting hole of the hardware stamping.

Compared with the prior art, the present invention has the following beneficial effects:
1. The connecting device has a light structure, compared with the prior art, is smaller in size and more convenient to install and improved in bearing capability and operation stability.
2. The cavity of the connecting device includes two rectangular squares, which are different in size. The two rectangular cavities are connected with each other; the small rectangular cavity has a thicker inner wall, which bears bigger torsional force during rotation.
3. The hardware stamping and the main body part of present invention respectively make contact on two sides, and have good stability after installation.

BRIEF DESCRIPTION OF THE DRAWINGS

The present invention will be further illustrated below in conjunction with the accompanying drawings and embodiments.

DETAILED DESCRIPTION

The present invention is described in further detail with reference to drawings attached to the description.

Embodiment 1

Figure 1:
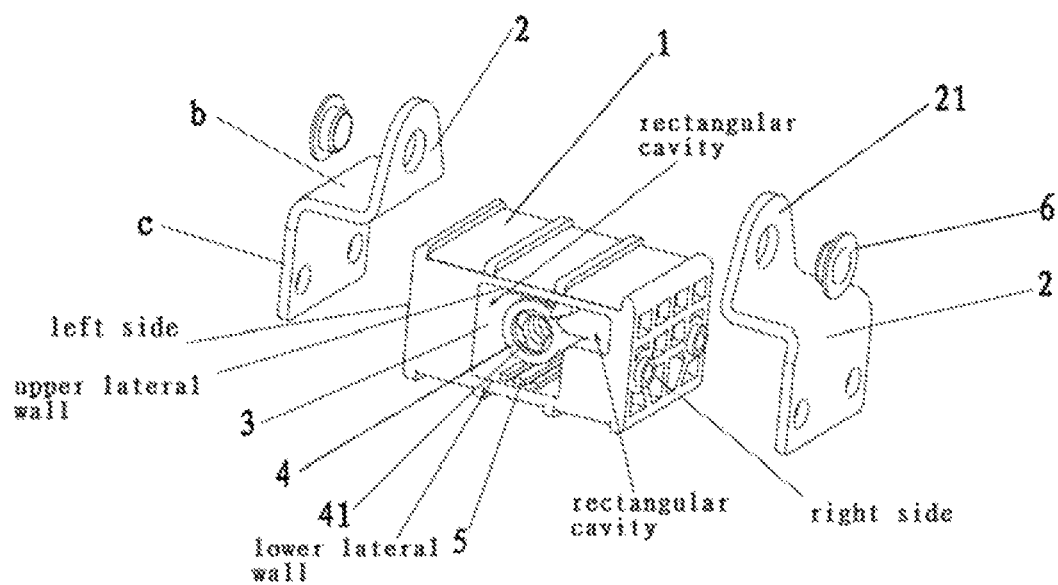
FIG. 1 is a structural view of the present invention in embodiment.
Figure 2:
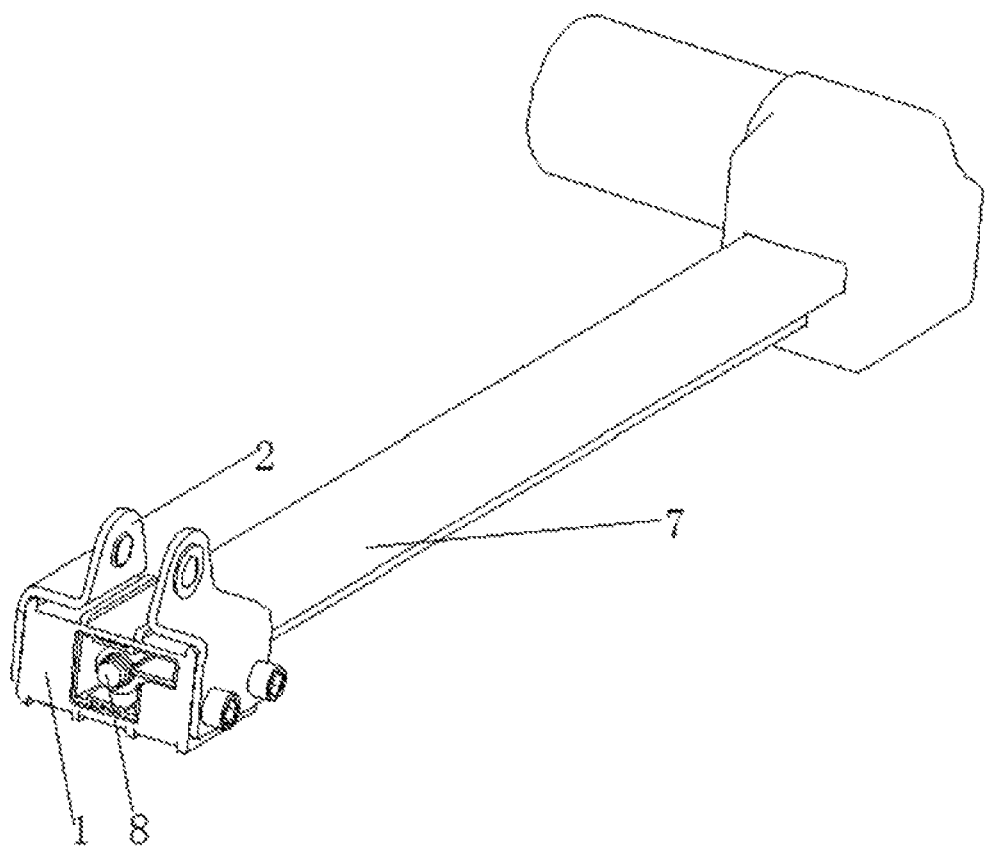
FIG. 2 is a structural view of installation of the present invention and a siding rail of the drive.

See FIGS. 1 and 2. The connecting device of the linear drive in the present invention comprises a main body part 1 and a hardware stamping 2. The main body part 1 has a rectangular profile. The main body part 1 is a plastic part, integrally formed by injection molding. The batch production is low in cost. The two outer sides of the main body part 1 are respectively fixedly connected with the hardware stamping 2. The hardware stamping 2 includes two reverse bends. The portion b between the two reverse bends is disposed above the main body part 1. The lower portion c of the hardware stamping 2 is tightly adhered to the two outer sides of the main body part 1 and bolted, thus achieving a good stability effect after installation. The upper portion of the hardware stamping is provided with a connecting hole 21.

The middle portion of the main body part 1 is provided with a hollow cavity 3. The hollow cavity 3 is provided with a threaded axle hole device 4 inside. The threaded axle hole device 4 is fixedly connected with the cavity 3. The threaded axle hole device 4 is provided with threaded holes 41. The cavity 3 is provided with locating protrusions 5 inside. The locating protrusions 5 ensure that the main body part 1 runs accurately in a sliding rail 7 of the drive. In terms of installation mode, the cavity 3 is sleeved with the sliding rail 7 of the drive. The sliding rail 7 of the drive is in clearance fit with the cavity 3. The threaded holes 41 are threaded connection with a screw 8. The screw 8 rotates such that the main body part 1 moves back and forth along the sliding rail 7 of the drive.

The locating protrusions 5 in the present invention are disposed on the inner wall of the cavity 3 in a vertically symmetric way.

The quantity of the locating protrusions 5 in the present invention is 3 on each of the upper and lower sides.

An axle sleeve 6 is also included, and the axle sleeve 6 is disposed in the connecting hole 21 of the hardware stamping.

What is claimed is:
1. A connecting device for a linear driver, wherein, the connecting device comprises a main body part and a hardware stamping,
   the main body part has a rectangular profile,
   a left side and a right side of the main body part are respectively fixedly connected with the hardware stamping,
   a middle portion of the main body part is provided with a hollow cavity,
   a threaded axle hole device is accommodated in and fixedly connected with the cavity and has a threaded hole inside,
   an upper lateral wall and a lower lateral wall of the cavity are provided respectively with locating protrusions, the threaded axle hole device is located between the upper lateral wall and lower lateral wall of the cavity, the hardware stamping includes two reverse bends, a portion between the two reverse bends is located above the main body part and the hardware stamping has a lower portion part and an upper portion part, the lower portion part of the hardware stamping is tightly adhered to the left side or the right side of the main body and bolted, while the upper portion of the hardware stamping is provided with a connecting hole.

2. The connecting device of linear drive according to claim 1, wherein,
the cavity includes two rectangular cavities different in size.

3. The connecting device of linear drive according to claim 1, wherein,
the main body part is made of plastic materials.

4. The connecting device of linear drive according to claim 1, wherein,
the locating protrusions are disposed on the upper lateral wall and lower lateral wall of the cavity in a symmetric way.

5. The connecting device of linear drive according to claim 4, wherein,
the number of the locating protrusions is 3 on the upper lateral wall and lower lateral wall of the cavity respectively.

6. The connecting device of linear drive according to claim 1, further comprising an axle sleeve which is disposed in the connecting hole of the hardware stamping.

* * * * *